United States Patent
Moghe et al.

(10) Patent No.: US 10,320,923 B2
(45) Date of Patent: Jun. 11, 2019

(54) PREDICTIVE RESOURCE PREPARATION AND HANDOFF FOR VEHICLE-TO-INFRASTRUCTURE SYSTEMS

(71) Applicant: Cisco Technology, Inc., San Jose, CA (US)

(72) Inventors: Ashok Krishnaji Moghe, Pleasanton, CA (US); John George Apostolopoulos, Palo Alto, CA (US); Andrea A. Gil Batres, Greenville, SC (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 15/254,240

(22) Filed: Sep. 1, 2016

(65) Prior Publication Data
US 2018/0063261 A1    Mar. 1, 2018

(51) Int. Cl.
*H04L 29/08* (2006.01)
*H04W 36/00* (2009.01)
(Continued)

(52) U.S. Cl.
CPC .............. *H04L 67/18* (2013.01); *G07C 5/008* (2013.01); *G08G 1/0112* (2013.01);
(Continued)

(58) Field of Classification Search
CPC ......... H04L 67/18; H04L 67/10; H04L 67/12; H04W 36/0083; H04W 36/16
See application file for complete search history.

(56) References Cited

U.S. PATENT DOCUMENTS 7,453,864 B2 * 11/2008 Kennedy ................. H04L 45/22
                                                     370/351
10,158,973 B1 * 12/2018 Surcouf ................ H04W 4/023
(Continued)

OTHER PUBLICATIONS

"Intelligent Traffic Signal System", http://www.iteris.com/cvria/html/applications/app43.html, May 5, 2016, 33 pages, U.S. Department of Transportation (US DOT), Washington, DC.
(Continued)

*Primary Examiner* — Joseph E Dean, Jr.
(74) *Attorney, Agent, or Firm* — Behmke Innovation Group LLC; James Behmke; Stephen D. LeBarron

(57) ABSTRACT

In one embodiment, a prediction agent process collects travel information of a vehicle, and determines a profile of the vehicle, the profile indicative of one or more real-time resource requirements of the vehicle. The prediction agent process also predicts a path of the vehicle based on the travel information, and determines a next resource node along the predicted path having one or more real-time resources corresponding to the one or more real-time resource requirements of the vehicle. After further predicting a time of arrival of the vehicle being within range of the next resource node based on the travel information, the prediction agent process informs the next resource node of the profile of the vehicle and the predicted time of arrival, the informing causing the next resource node to operate the one or more real-time resources for the vehicle for the predicted time of arrival.

20 Claims, 11 Drawing Sheets

(51) Int. Cl.
*H04W 4/14* (2009.01)
*G08G 1/01* (2006.01)
*G07C 5/00* (2006.01)
*G08G 1/052* (2006.01)
*G08G 1/087* (2006.01)
*G08G 1/123* (2006.01)
*G08G 1/00* (2006.01)
*H04W 4/44* (2018.01)
*H04W 36/32* (2009.01)

(52) U.S. Cl.
CPC ......... *G08G 1/0133* (2013.01); *G08G 1/0145* (2013.01); *G08G 1/052* (2013.01); *G08G 1/087* (2013.01); *G08G 1/123* (2013.01); *G08G 1/205* (2013.01); *G08G 1/207* (2013.01); *H04L 67/12* (2013.01); *H04W 4/44* (2018.02); *H04W 36/00835* (2018.08); *H04W 36/32* (2013.01)

(56) References Cited

U.S. PATENT DOCUMENTS

| | | | |
|---|---|---|---|
| 2012/0072096 A1* | 3/2012 | Chapman | G08G 1/0133 701/118 |
| 2015/0056920 A1* | 2/2015 | Huttunen | H04B 7/26 455/41.2 |
| 2015/0088406 A1* | 3/2015 | Blandin | G08G 1/0133 701/117 |

OTHER PUBLICATIONS

"Transit Signal Priority", http://www.iteris.com/cvria/html/applications/app79.html, May 5, 2016, 20 pages, U.S. Department of Transportation (US DOT), Washington, DC.

* cited by examiner

PREDICTIVE RESOURCE PREPARATION AND HANDOFF FOR VEHICLE-TO-INFRASTRUCTURE SYSTEMS

TECHNICAL FIELD

The present disclosure relates generally to computer networks, and, more particularly, to predictive resource preparation and handoff for vehicle-to-infrastructure (V2X) systems.

BACKGROUND

Smart and connected communities around the world are exploring smart applications and infrastructures using vehicle-to-infrastructure (V2X) communication. The vehicles in these infrastructures use services of stationary nodes comprised of "fog" computing devices and real-world assets and resources controlled by road-side controllers (RSCs). As a vehicle moves from the zone of one node to the next, the applications running on a vehicle need to re-negotiate and obtain resources from the new host node to continue operation. Currently, such re-negotiation and resource allocation for V2X systems is an inefficient model, and applications available now and in the future will require more seamless resource allocation and transition for moving vehicles.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
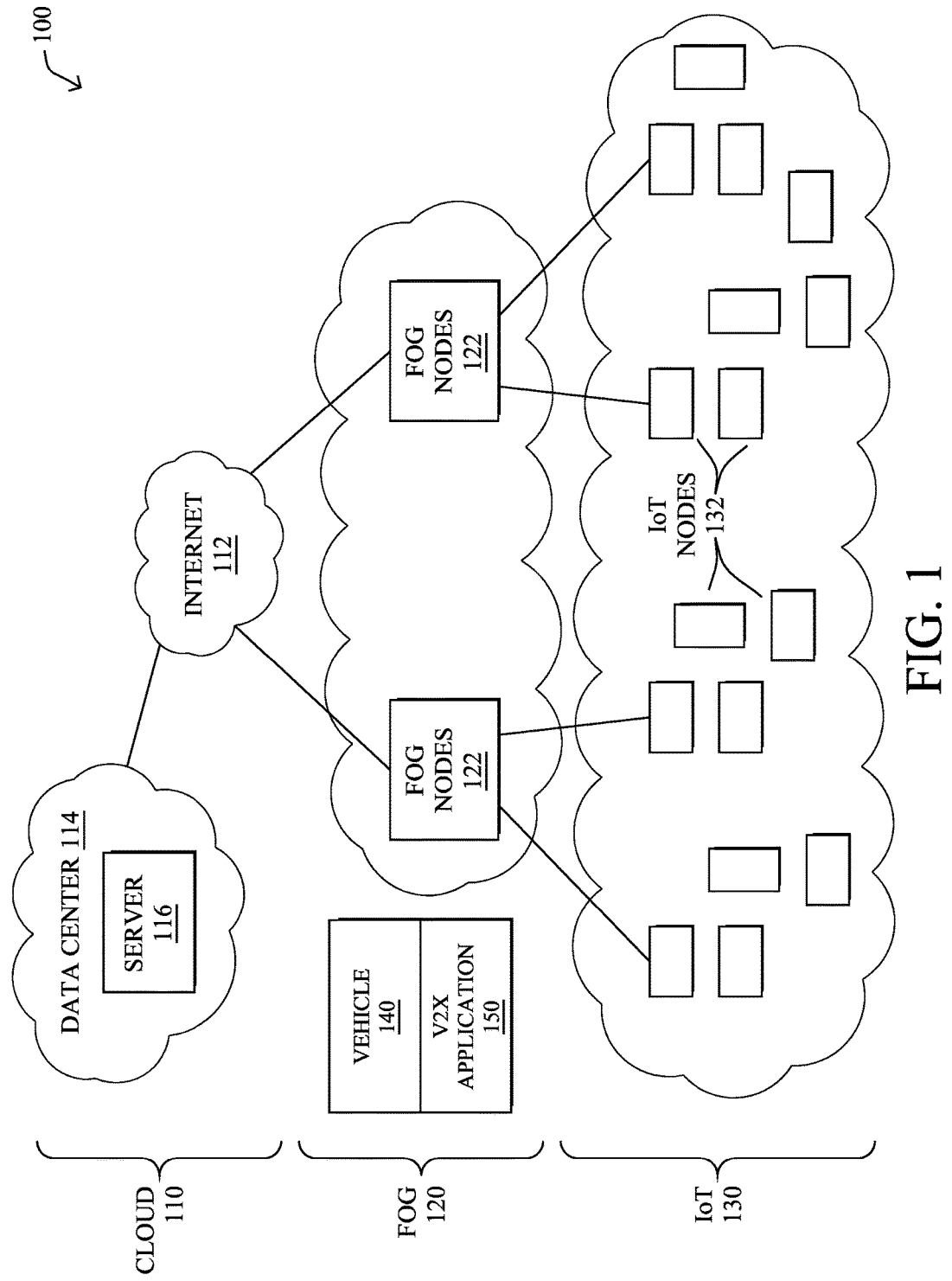
FIG. 1 illustrates an example communication network.

According to one or more embodiments of the disclosure, a prediction agent process collects travel information of a vehicle, and determines a profile of the vehicle, the profile indicative of one or more real-time resource requirements of the vehicle. The prediction agent process also predicts a path of the vehicle based on the travel information, and determines a next resource node along the predicted path having one or more real-time resources corresponding to the one or more real-time resource requirements of the vehicle. After further predicting a time of arrival of the vehicle being within range of the next resource node based on the travel information, the prediction agent process informs the next resource node of the profile of the vehicle and the predicted time of arrival, the informing causing the next resource node to operate the one or more real-time resources for the vehicle for the predicted time of arrival.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

In addition, and as described further below, one or more vehicles 140 may be configured with one or more vehicle-to-infrastructure (V2X) processes 150 that participate with certain nodes within the network 100.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure. For example, though vehicle 140 and V2X Application 150 are shown within the fog layer 120, this is merely an example, and does not imply their existence at that particular layer from a network perspective. For instance, the vehicle may instead be viewed as a "thing" within the IoT layer 130, yet may also provide a Fog-type capability to people within the vehicle or to the surrounding environment. Accordingly, the visual location of the vehicle within FIG. 1 is not meant to limit the scope of the embodiments herein.

Figure 2:
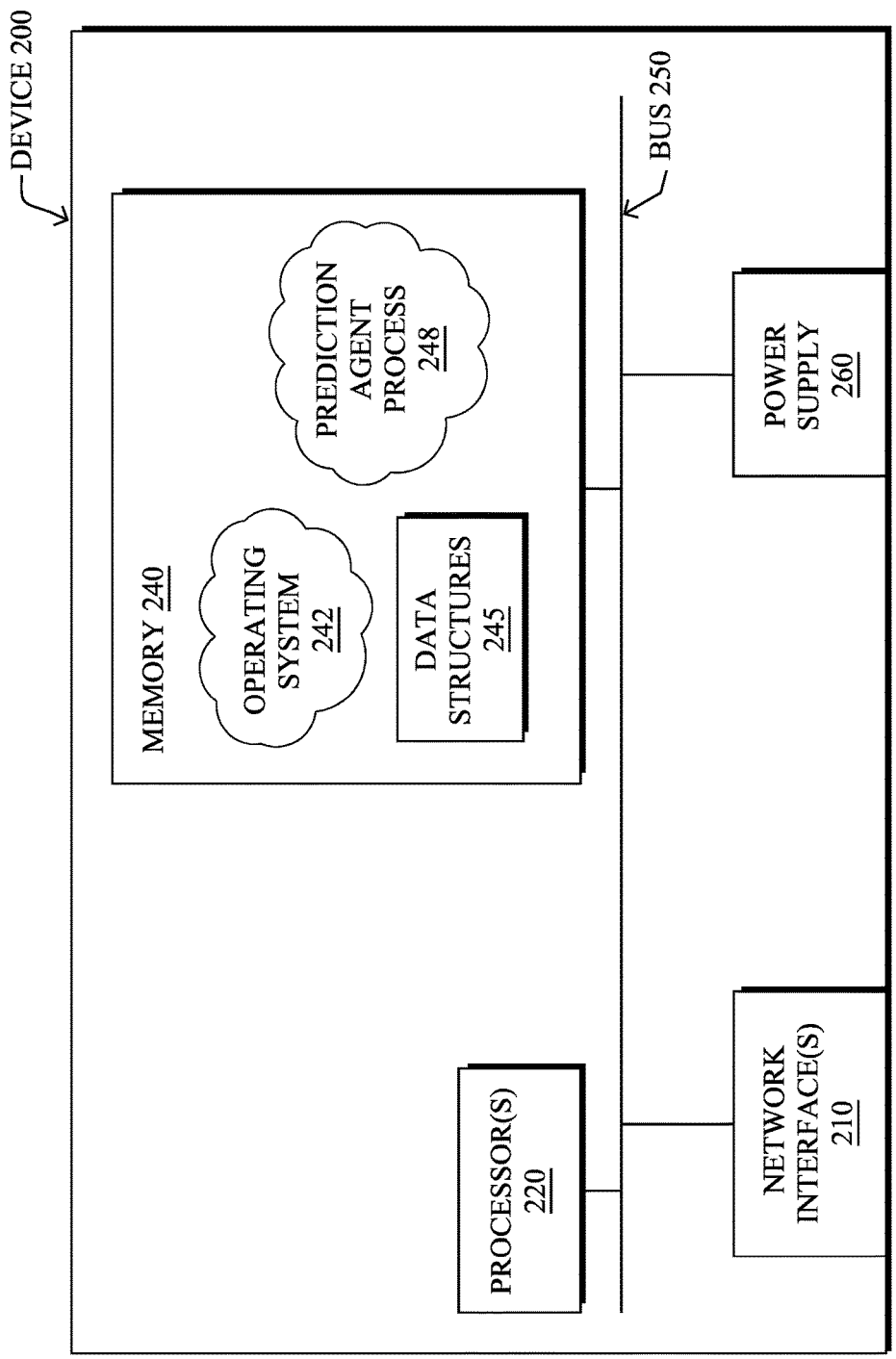
FIG. 2 illustrates an example network device/node.

FIG. 2 is a schematic block diagram of an example computing device 200 that may be used with one or more embodiments described herein e.g., as any of the devices shown in FIG. 1 above, and particularly as either the autonomous carrier 140 and/or fog module 150, as described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections (for fog modules 150), and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative "modular fog" process 248, as described herein.

Note that as described below, one or more interconnects 290 may also be present on the device 200, such as various mechanical and/or electrical interconnects to allow interconnection between, e.g., an autonomous carrier 140 and a fog module 150, a fog module 150 to other fog modules 150, or a fog module 150 and a fog module enclosure, described below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, smart and connected communities around the world are exploring smart applications and infrastructures using vehicle-to-infrastructure (V2X) communication. The vehicles in these infrastructures use services of stationary nodes comprised of "fog" computing devices and real-world assets and resources controlled by road-side controllers (RSCs). As a vehicle moves from the zone of one node to the next, the applications running on a vehicle need to re-negotiate and obtain resources from the new host node to continue operation. Currently, such re-negotiation and resource allocation for V2X systems is an inefficient model, and applications available now and in the future will require more seamless resource allocation and transition for moving vehicles.

Figure 3:
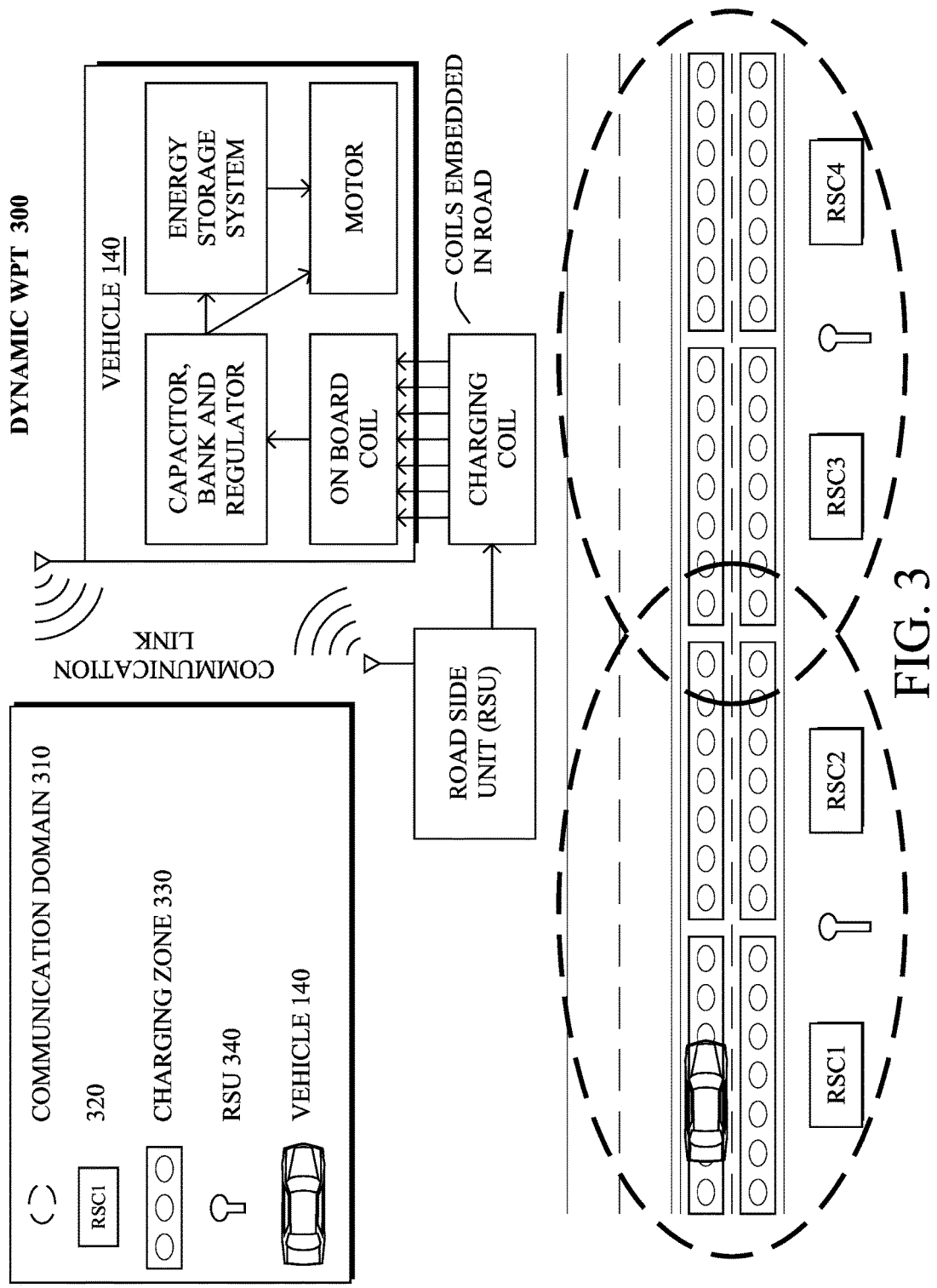
FIG. 3 illustrates an example of a dynamic wireless power transfer (WPT) technology system.

Many of these applications will be administering real-world resources at these nodes. As one example, as shown in FIG. 3, a dynamic wireless power transfer (WPT) technology system 300 uses inductive coils (charging zones 330) embedded in lanes and driven by grid controllers (road-side units (RSUs) 340 and/or road-side controllers (RSCs) 320 of certain communication domains 310) that dynamically control these coils to deliver energy to vehicles 140 as they pass over them. Availability of sufficient amount of electrical energy in the form of electric charge present at correct series of coils is an example of such a resource that is provisioned and administered by the V2X infrastructure. In particular, as the vehicle moves from one RSC to next, the electrical coil associated with the new RSC is the one adjacent and under the control of that RSC. So as the associativity changes, so does the location of the application resource (electrical coils and charge delivery mechanism).

In another example, in traffic prioritization systems there will be traffic signal controllers connected with V2X communication devices (RSUs) like dedicated short-range communications (DSRC) radios at every intersection that will be controlling the traffic signals to prioritize the passage of priority vehicles (public transport buses, light rails/trains, emergency vehicles, etc.). The availability of passage through a particular series of intersections for priority vehicles represents such a resource controlled by the V2X infrastructure.

Also, in case of Fog or edge applications depending on the "arriving" applications from the vehicle side, the dynamic provisioning of Fog node Quality of Service (QoS), CPU/Memory allocation, Security settings, etc. are also examples of resources that dynamically move as the vehicle associativity with the infrastructure edge nodes moves. For instance, there may be a video processing application running between the vehicle and the Fog element co-located at the RSC. There is a certain QoS that is provisioned at the currently associated RSC/Fog node between the node and the cloud. As the vehicle transitions to next RSC/Fog domain, that node will have to provision the QoS between itself and the cloud in order to serve the vehicle application that it will start serving. Thus the available bandwidth/QoS between the RSC "base stations" will need to traverse along with the vehicles traversing path from one node to the next.

In essence the problem addressed herein is to be able to predict a) how a vehicle will move within the infrastructure and which will be the likely next node to which it will be attached, b) what resources at that next node will be needed in order to continue currently running application services, and c) what time the vehicle will become associated with the new node and start using the resources at the new node. As most of these applications are real-time and external resource dependent, the nodes need to have these resources provisioned and ready in time for the application to continue seamlessly. That is, the practicality and feasibility of these applications will depend on the ability of the infrastructure to provide same level of resource availability as the vehicle traverses a series of nodes. Given the transitory nature of vehicle to node associativity, the resource provisioning has to happen rapidly as the handover from one node to next takes place. Said differently, real-time response in provisioning these resources in accurate space and time dimensions is required to make these applications work.

—Predictive Resource Preparation and Handoff for V2X Systems—

Vehicle-to-infrastructure (V2X) communication will enable smart infrastructures that orchestrate services and external resources at edge nodes. The practicality and feasibility of smart applications will depend on the infrastructure's ability to provision these resources with real-time response constraints, as a vehicle utilizing these services and resources, moves from the zone of one node to the next. The techniques herein, therefore, add value to the infrastructure by enabling the task of managing and provisioning resources under real-time constraints and providing improved performance by moving that role from the application to the network.

Specifically, according to one or more embodiments of the disclosure as described in detail below, a prediction agent process collects travel information of a vehicle, and determines a profile of the vehicle, the profile indicative of one or more real-time resource requirements of the vehicle. The prediction agent process also predicts a path of the vehicle based on the travel information, and determines a next resource node along the predicted path having one or more real-time resources corresponding to the one or more real-time resource requirements of the vehicle. After further predicting a time of arrival of the vehicle being within range of the next resource node based on the travel information, the prediction agent process informs the next resource node of the profile of the vehicle and the predicted time of arrival, the informing causing the next resource node to operate the one or more real-time resources for the vehicle for the predicted time of arrival.

Illustratively, the techniques described herein may be performed by hardware, software, and/or firmware, such as in accordance with the prediction agent process 248, which may contain computer executable instructions executed by the processor 220 (e.g., on a single device, or else distributed across a plurality of devices) to perform functions relating to the techniques described herein, e.g., in conjunction with other processes and/or devices, accordingly. Notably, the prediction agent process 248 may illustratively be located on any fog node (e.g., RSCs, RSUs, etc.), but may also be in the cloud (e.g., servers), or else on the vehicles 140 themselves, or any combination thereof (including distributed participation between multiple devices/nodes).

Figure 4:
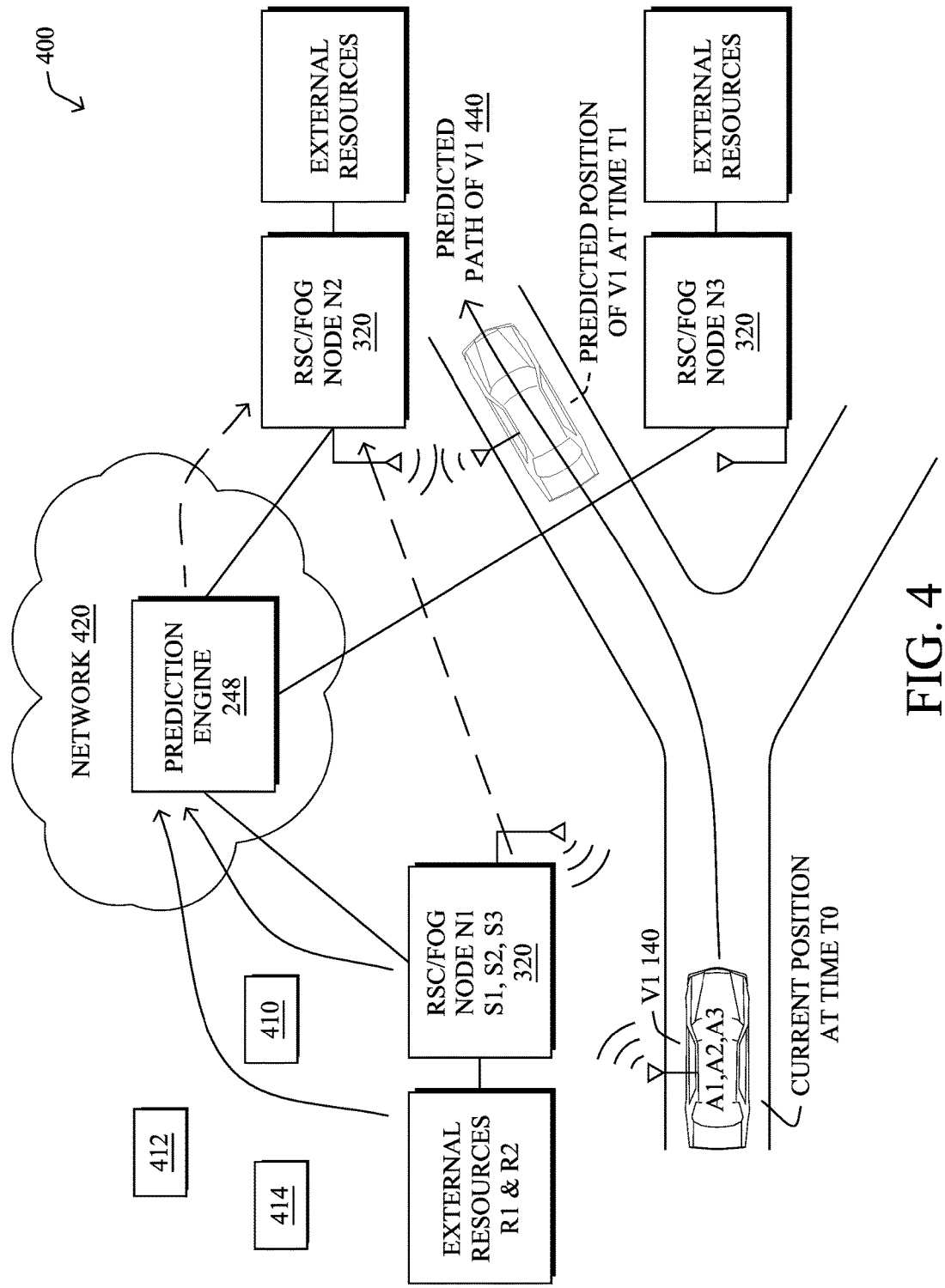
FIG. 4 illustrates an example of predictive resource preparation and handoff for vehicle-to-infrastructure (V2X) systems.

Operationally, and with reference generally to the V2X environment 400 shown in FIG. 4, the techniques herein are based on various predictive and preparatory features as described herein. For instance, with reference to FIG. 4, in a first step "(1)", when a vehicle "V1" (140) is associated with a node 320 (e.g., an RSC "N1") for its V2X communication, that node already can collect a profile 410 of the connected vehicle, including its "travel information" in the form of vehicle position, current time, direction, speed of travel, etc.

In step "(2)", a prediction agent process 248 running in the network 420 (e.g., cloud/fog) collects the vehicle real time data as mentioned above. Note that the prediction agent process may generally operate within one or more devices of a network infrastructure other than the vehicle, though may be a portion of the vehicle 140 in certain embodiments. Said differently, the techniques herein remove a per-resource application is out of the vehicles into the infrastructure, such as to provide the ability to add management for new resources without requiring adding software to all vehicles, as well as providing other benefits.

In step "(3)", based on different extrapolation techniques (as listed below), the prediction agent predicts the next possible node and the time-of-arrival at that node (a predicted path). Note that the current node also has a profile 412 with information about various applications that are interacting with the corresponding peer applications running on the vehicle side (in step "(4)"), such as apps A1, A2, A3 using services S1, S2, and S3, and also a profile 414 with information of various resources utilized by all these applications (in step "(5)"), such as resources R1 and R2. These are also sent to the predicted next node.

Regarding the time-of-arrival computation, the real time data such as current vehicle position, current time, direction, speed of travel may be combined with other real time sensor data from the rest of the infrastructure (such as, e.g., average traffic delays on the road, etc.) to predict the time-of-arrival with even more accuracy.

In step "(6)", the prediction agent instructs the current node N1 to send the vehicle profile 410, applications profile 412, and resource profile 414 to the next node N2, as well as any state information required by the next node to form a seamless handover. Note that in some cases there may be multiple "candidate next nodes" identified, and this is performed for each candidate next node. Note further that while in one embodiment the communication between nodes traverses the network 420, other embodiments allow for point-to-point (or peer-to-peer), P2P, communication between the current node and the next node, accordingly. For example, P2P communication instead of only fog/central communications to make predictions may be useful for particular situations, such as for high-speed moving objects (e.g., for latency reasons). In addition, the P2P context exchange is also beneficial for privacy reasons, such as, for example, where an identity or application context may need to meet certain privacy restrictions, and the P2P context exchange may enable limiting exposure within the domain (e.g., without leaving the domain and traversing through other domains/clouds). Moreover, when the prediction agent process 248 operates within a current resource node N1, then this informing step (6) comprises a state handoff between the current resource node and the next resource node N2, accordingly.

In step "(7)", the techniques herein thus allow a next node N2 to prepare and be ready with the allocation of resources and application context already setup for the incoming vehicle by the time-of-arrival (A1, A2, A3, S1, S2, S3, R1, R2, etc.). When the vehicle eventually arrives in this new node's zone in step "(8)", the vehicle and applications can continue operation with low or no delay, enabling a seamless transition from node to node. In addition, all other "candidate next nodes" (see step 6) which are not candidates to be a future node can release the associated reserved resources. (That is, when there are multiple predicted and possible paths, both paths may have an associated "next node" set up, such that the unneeded node may be ramped down, assuming such resources are not needed for another vehicle soon to follow (e.g., car A didn't turn right, but car B did and needs the same resources at node N3).

As an added benefit, the ability to predict next hop and time-of-arrival at the next hop enables the fog elements and RSCs within the smart infrastructure to be kept in power-saving modes where power saving is critical and can still be woken up in time and made ready to meet real-time response constraints. That is, application of these predictions create power saving advantages which are very relevant in the IoT eco-system. Several resources co-located in the RSC/FOG node could be woken up from sleep, primed and made ready just in time at the time-of-arrival to realize crucial power benefits. For example several of these nodes could be operating in areas with solar panel/battery systems and serving momentarily. In some cases the vehicle traffic could be sparse, e.g., at night, such that keeping all nodes running at full power all the time is unnecessary and wasteful of energy.

This process described in FIG. 4 continues across the entire infrastructure as the vehicle traverses several zones.

Figure 5:
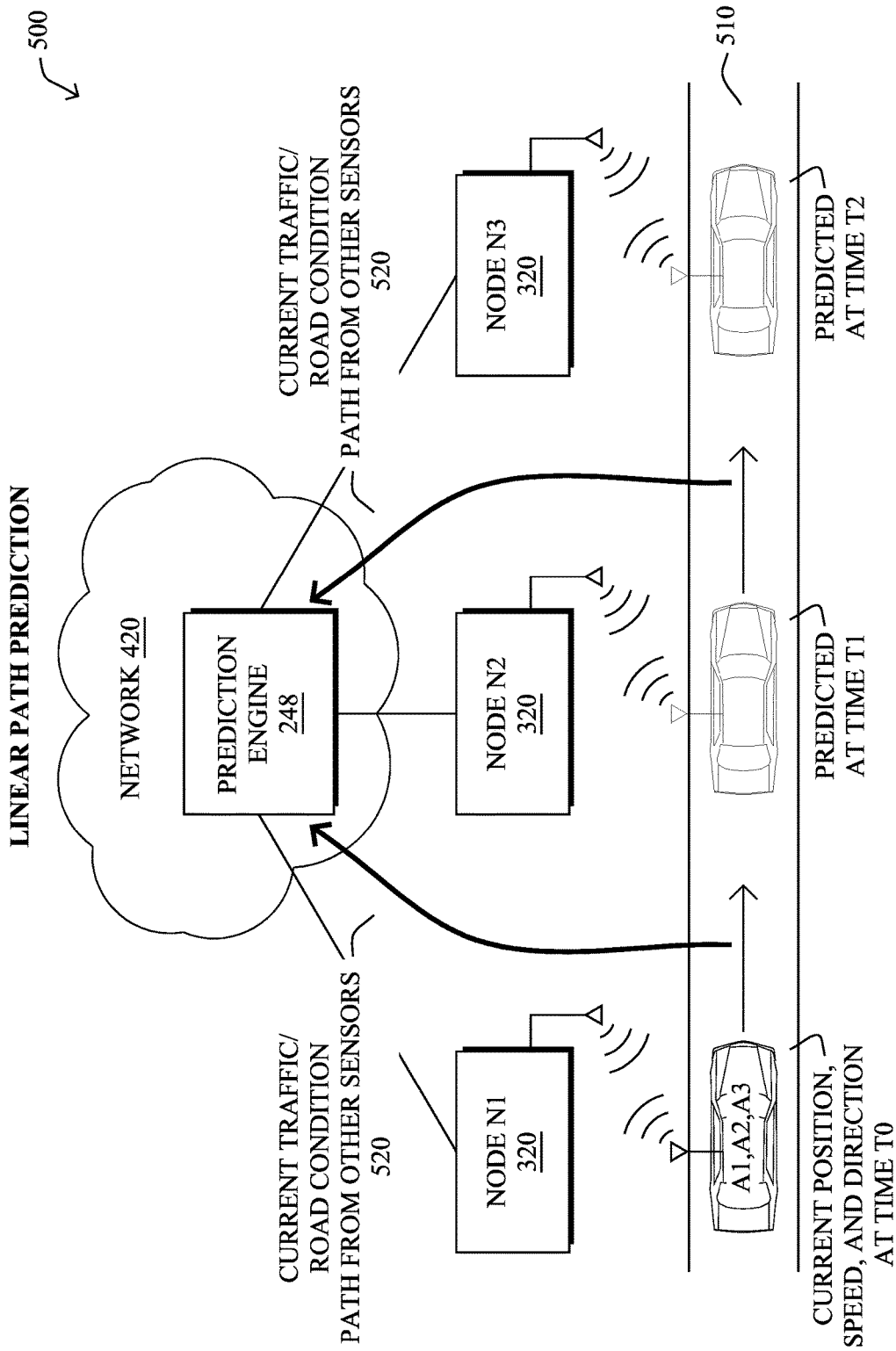
FIGS. 5-7 illustrate examples of path prediction techniques.
Figure 6:
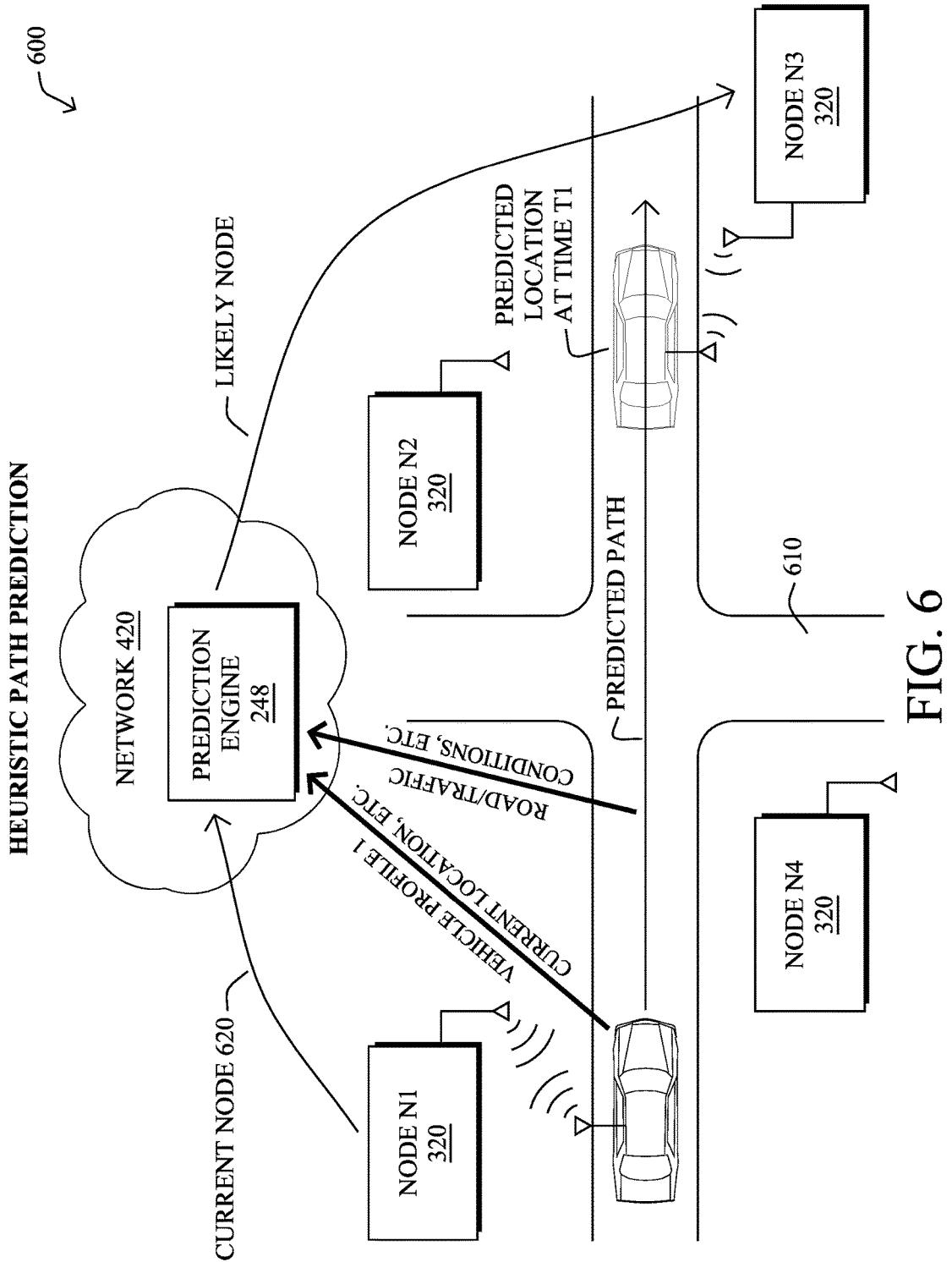
Figure 7:
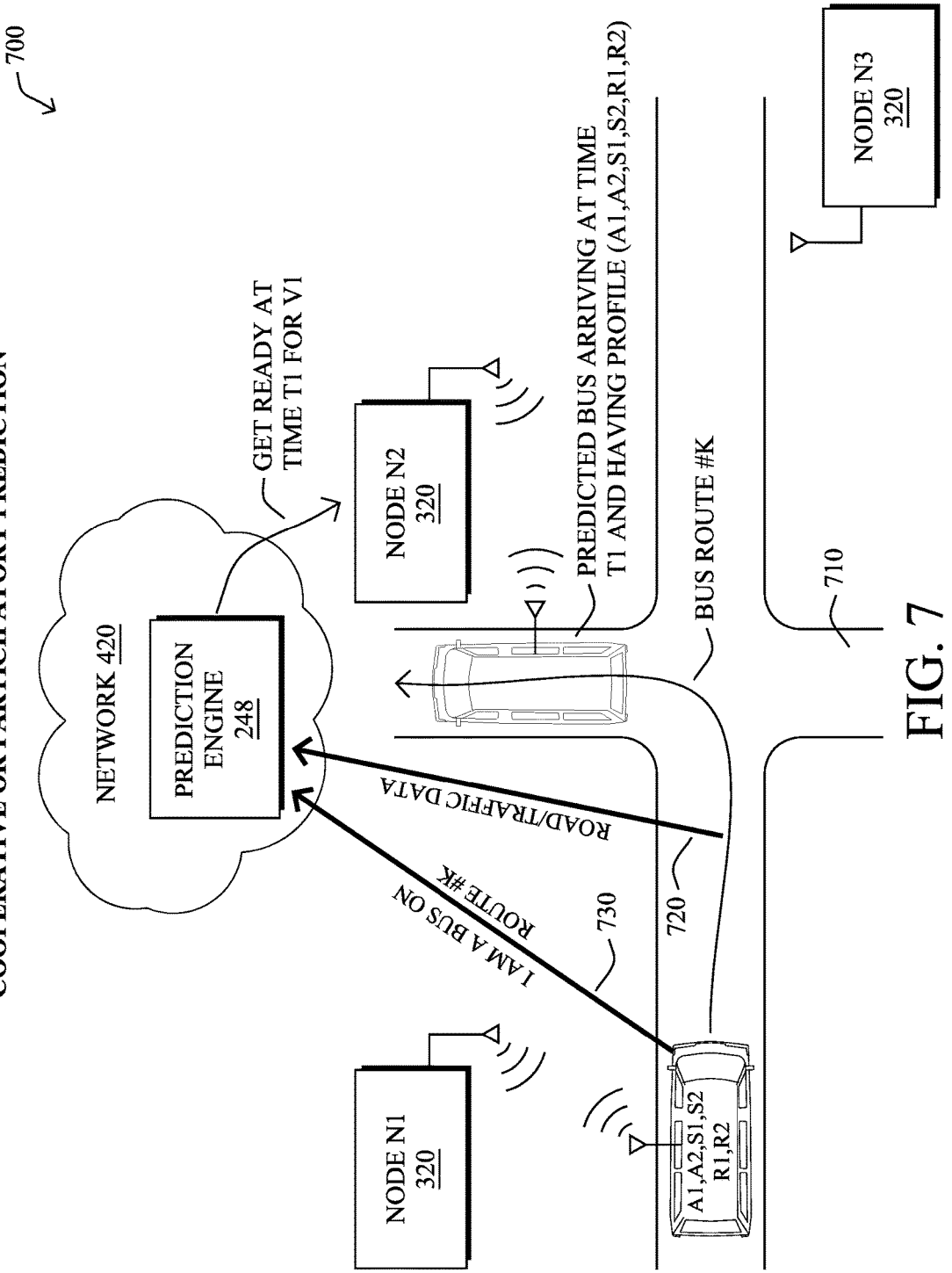

FIGS. 5-7 illustrate examples of techniques that made be used to predict a vehicle's next node. In particular, in FIG. 5, a linear path prediction 500 is shown, where in its simplest form of prediction, based on the locations of nodes N1, N2, N3, etc., and a straight path of travel 510 (such as on a road without any intersections between the two consecutive nodes, or a lane on a highway), real time sensor data 520 such as current vehicle position, current time, direction, speed of travel, etc., can be used by an application running in the infrastructure (prediction engine/agent 248) to predict the handover of the vehicle from the current Node to the next Node at given predicted times of arrival T1, T2, and so on.

FIG. 6 illustrates heuristic path prediction 600, where, for example, in the case of a more complex topology beyond simple straight path linear prediction (path 610 with options), the prediction algorithm may use heuristics from relevant vehicle and condition information 620 and its collected database of vehicle travel patterns based on their profiles (such as their make, model, speed, their application fingerprints, the time-of-day, driving history, identification of vehicle using public domain information like wireless MAC addresses, an individual using the same or similar path to work every day, etc.) and apply statistical modeling to predict the next possible hop for the handover (e.g., based still on current travel conditions). For example, assume the vehicle shown is using an app "A1", services "S1", and resource "R1", which based on this profile, may be determined/identified to be an emergency vehicle. As such, the prediction engine/agent 248 may predict that the most likely path of the vehicle will pass node N3 based on the history, for example, of another emergency vehicle (using an app "A1", services "S1", and resource "R1") having taken the same path recently. Certainly, other statistical inputs and models may be used, and that shown herein is merely an example not meant to be limiting to scope of the embodiments herein.

As still another example, FIG. 7 illustrates a cooperative (or "participatory") path prediction 700, where in yet another and more evolved scenario, the vehicles can be made to share their proposed travel plans using their planned travel maps on paths 710, that is, cooperating or participating in the delivery of services by the smart infrastructure by sharing planned route information 730. Based on this information, and optionally in addition to current traffic information 720, the prediction engine/agent 248 may make the appropriate predictions, accordingly. In some cases this is completely feasible even for the current state of technology. As an example, in case of a public transportation, a bus may already be moving along a predetermined route 730, as shown. In yet another scenario, an emergency vehicle, which is responding to a call and traveling from point A to point B, may be given the best route by an application running in the same infrastructure along which it will provide the shortest travel time. As this emergency vehicle proceeds along the recommended route, the prediction algorithm already knows the next possible hop. As still another example, as the smart vehicles with V2X communication proliferate the proposed path sharing with smart infrastructure (e.g., sharing a navigation system proposed route), the ecosystem can become more cohesive and prevalent.

In a further example embodiment, cooperative path prediction may involve a negotiation between the application and the infrastructure to reach a mutually preferred solution. For instance, assume the vehicle needs energy and would prefer to go along "path A" (and makes a request for energy and path A), yet the infrastructure suggests that it can provide cheaper energy if the vehicle were to go along "path B" (and provides the information/cost for path A and also an alternative lower cost option for path B). The vehicle may then decide to use path B and notifies the infrastructure, which then prepares the resources. As another example of a negotiated and converged solution, assume the vehicle needs N units of energy and requests this from the infrastructure. If the infrastructure then provides three options (e.g., a) receive all N units at the first upcoming node for cost 10, b) get N/2 units at the first node and N/2 units at the second node for cost 7, or c) get 0 units at the first node and N units at the second node for cost 5). In this situation, the vehicle may once again decide which options are feasible or preferred and then notifies the infrastructure. Note that the vehicle may perform these negotiations with or without knowledge of the vehicle occupants (e.g., the vehicle occupants don't need to know at which nodes the vehicle is getting charged, only that the vehicle is getting charged as needed).

Figure 8:
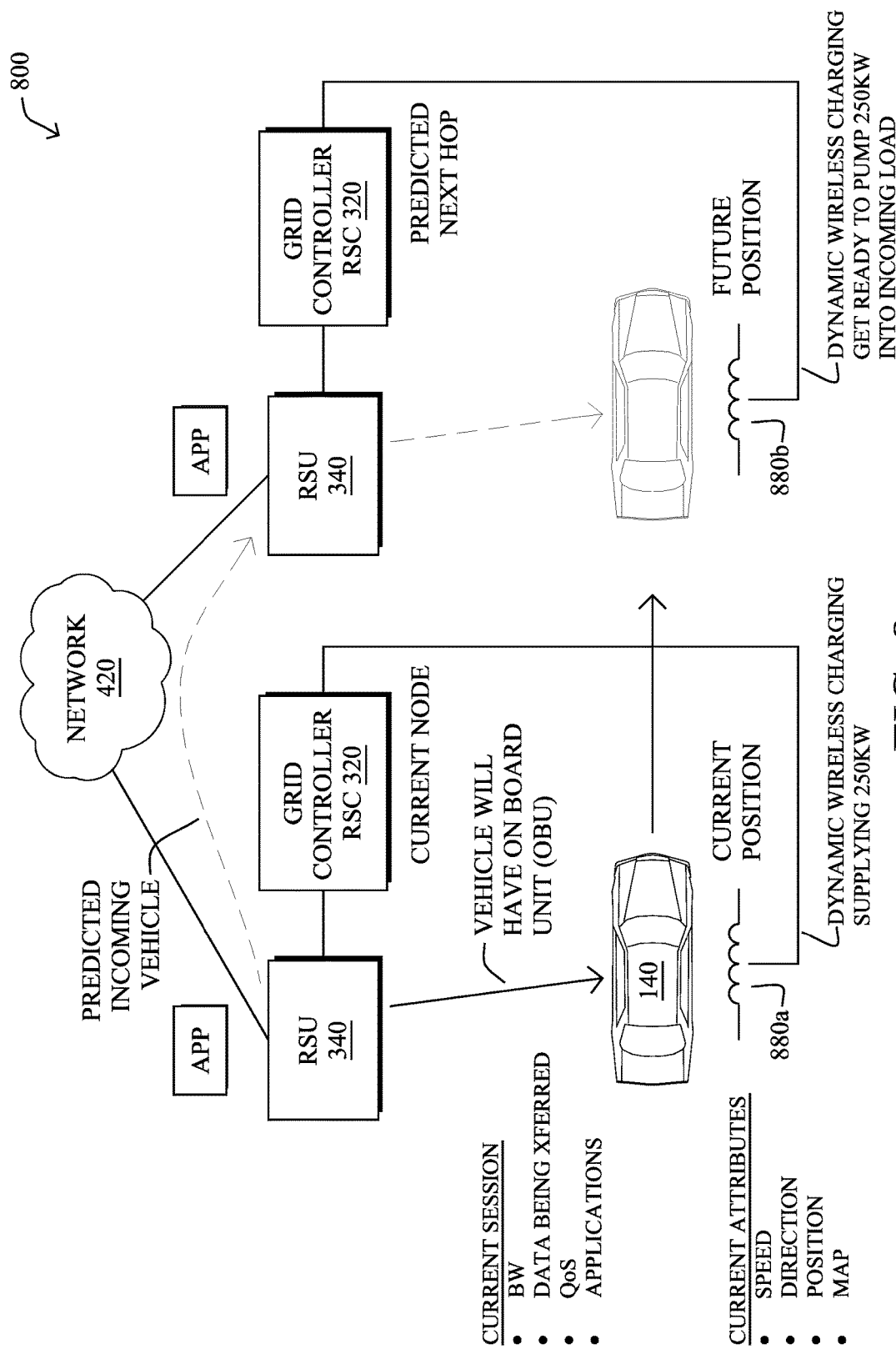
FIGS. 8-10 illustrate examples of V2X environments in which predictive resource preparation and handoff for V2X systems may be used.
Figure 9:
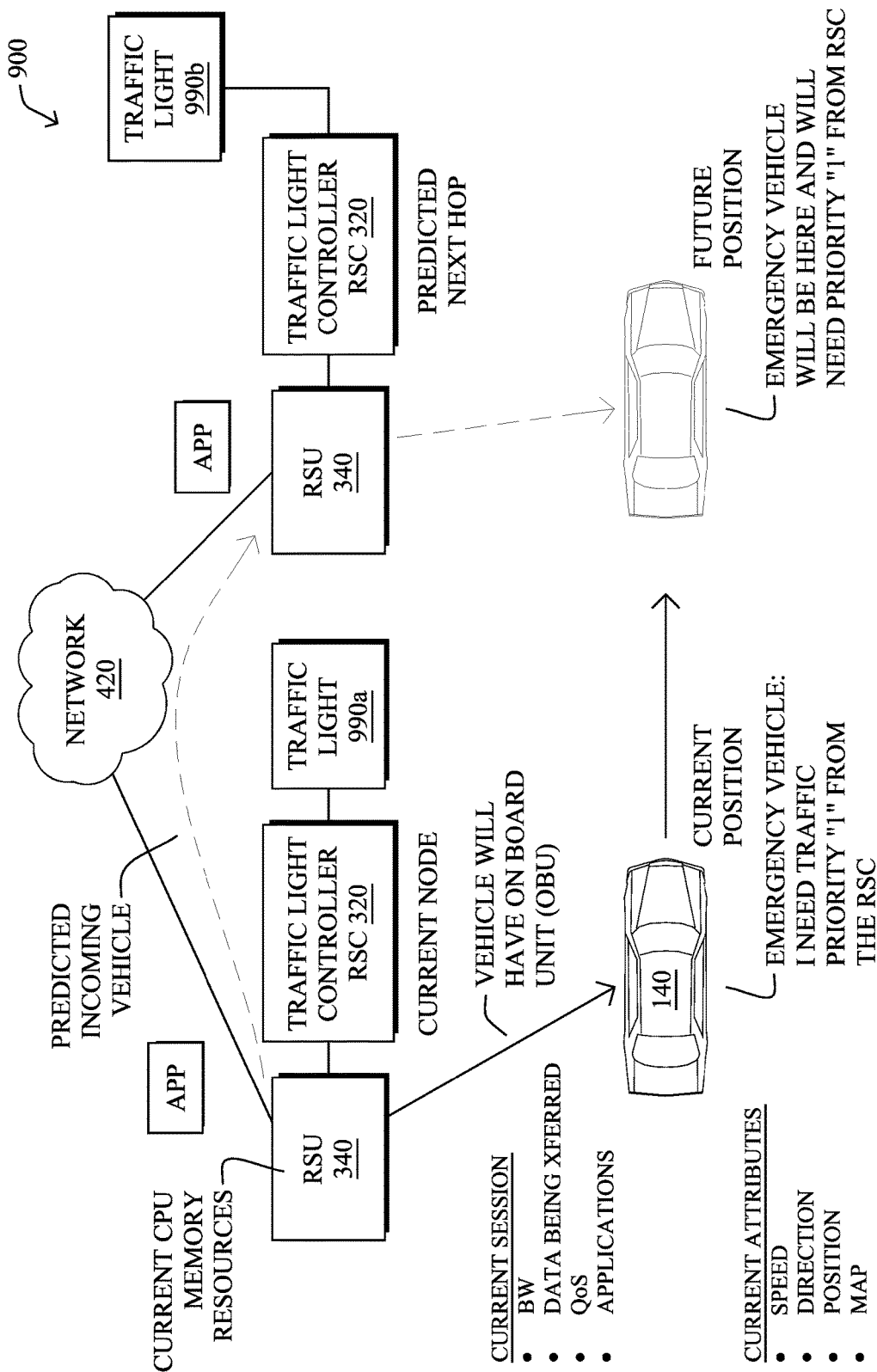
Figure 10:
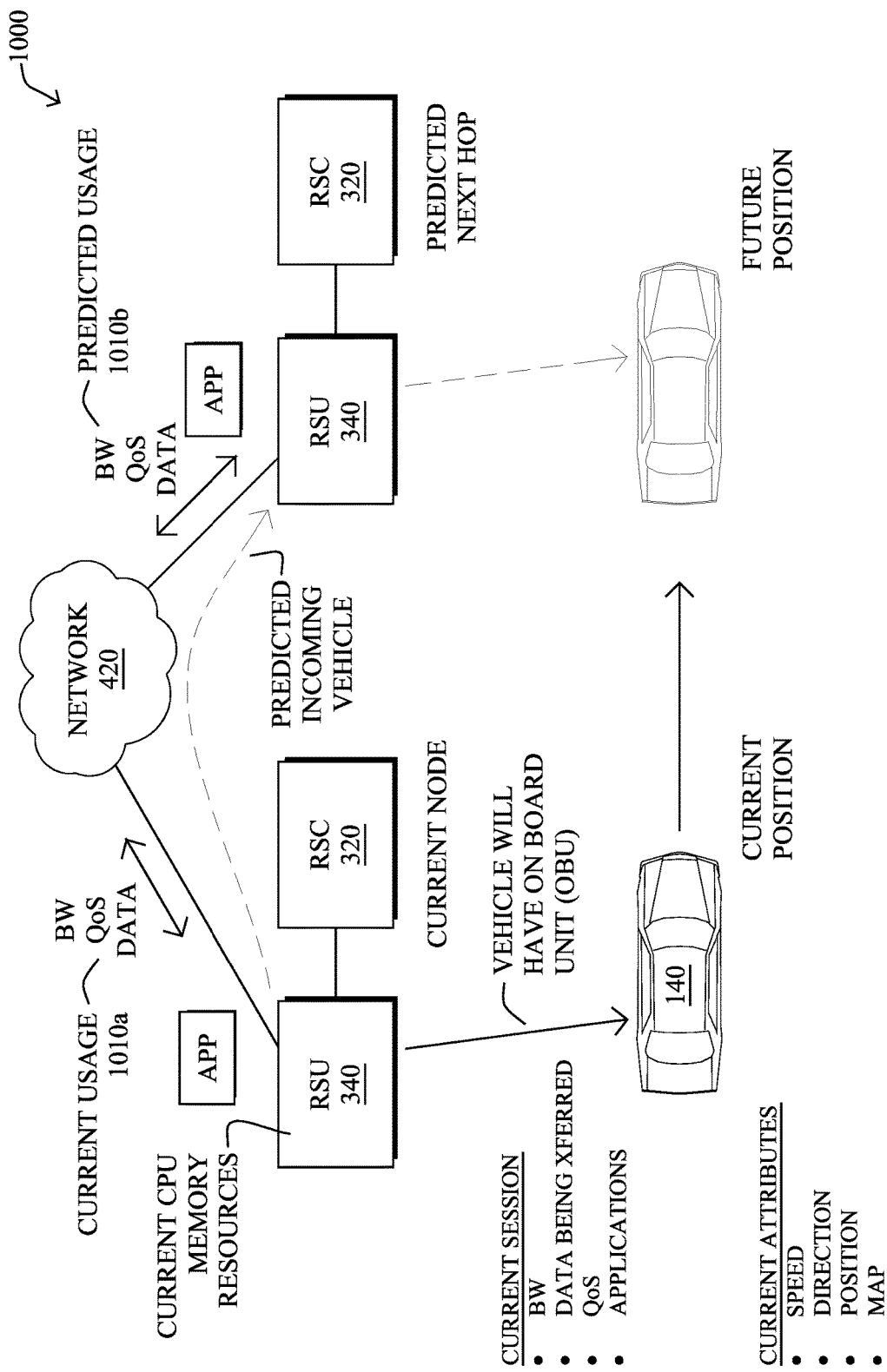

FIGS. 8-10 illustrate specific examples of V2X environments in which predictive resource preparation and handoff for V2X systems may be used as described above, based on the illustrative configuration of environment 400 of FIG. 4. FIG. 8, in particular, illustrates a WPT environment 800, where the system predicts and prepares for energy management of induction coils 880 (e.g., a current coil 880a, and a predicted next coil 880b). For instance, the next resource node (predicted next hop/RSC 320) is caused to operate a dynamic wireless power transfer as the one or more real-time resources for the vehicle for the predicted time of arrival, such as by pre-charging an in-road inductive charging system 880 substantially near the predicted time of arrival to be ready for delivery of an inductive charge to the vehicle at an actual time of arrival.

Conversely, FIG. 9 illustrate an example environment 900 where the next resource node is caused to operate a traffic signal 990 as the one or more real-time resources for the vehicle for the predicted time of arrival. That is, FIG. 9 illustrates an example of traffic priority control (predicting and provisioning of traffic priority as a resource). For example, the techniques herein may predictively manage traffic lights 990 (e.g., a current light 990a and a predicted next/future light 990b) for different classes of priority vehicles (e.g., normal, commuter buses, emergency vehicles, etc.). Illustratively, the techniques may thus be used for car-to-intersection signaling, where improving location/speed prediction can beneficially control intersections that are managed by the predictions. For instance, the next resource node (e.g., an RSC 320) may operate the traffic signal 990b according to a vehicular priority of a given vehicle against one or more other vehicles predicted to be at the traffic signal at the predicted time of arrival. As an illustration, an emergency vehicle may have top priority (e.g., "1"), while other vehicles have a lower priority (e.g., "2" or greater). In another illustration, commuter buses may have a priority over standard traffic, and certain buses (e.g., those headed toward a city, or those with more passengers, etc.) may have higher priorities than other buses (e.g., those headed away from the city, those with fewer passengers, etc.). It is important to note that according to the techniques herein, predictions can be made such that the light may be green when the priority vehicle is expected to arrive: not before, and not after. In this manner, traffic management techniques may benefit from distribution algorithms and priority policies, allowing for certain lights to be controlled in a fashion that reduces congestion at intersections, and particularly that allows for the passage of higher priority vehicles (e.g., emergency vehicles) with minimal adverse impact.

Lastly, FIG. 10 illustrates an example of an environment 1000 where the one or more real-time resource requirements of the vehicle are fog resources, such as processing (CPU) power, memory, security measures, bandwidth, quality of service (QoS) attributes, application execution, server connectivity, etc. For instance, based on current usage (1010a) of fog resources, the system described herein can determine predicted future usage (1010b) at a predicted next node (e.g., RSC 320), and can allocate such resources, accordingly, in anticipation of the vehicle at the predicted time of arrival.

Figure 11:
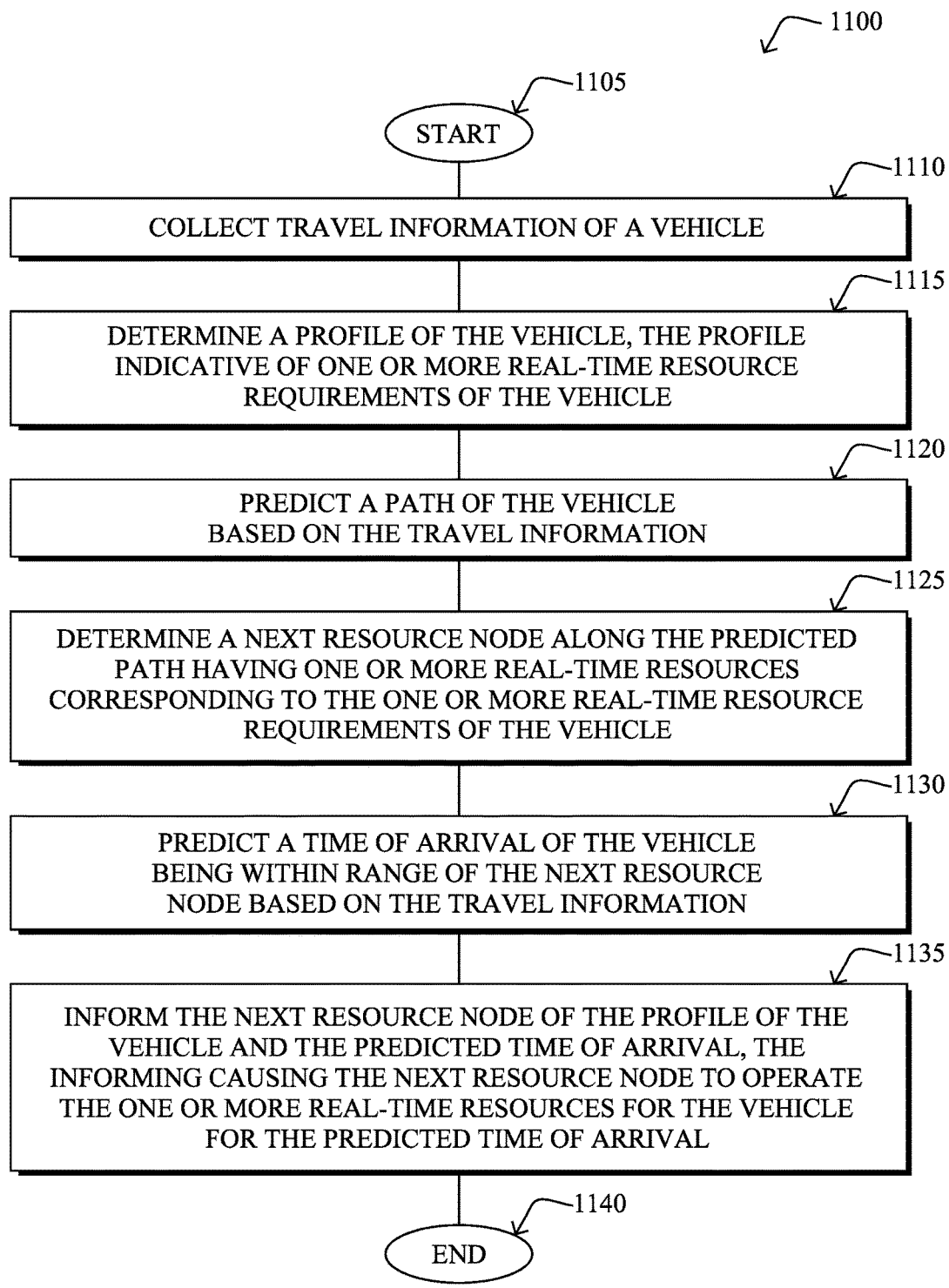
FIG. 11 illustrates an example simplified procedure for predictive resource preparation and handoff for V2X systems.

FIG. 11 illustrates an example simplified procedure for predictive resource preparation and handoff for vehicle-to-infrastructure (V2X) systems in accordance with one or more embodiments described herein. The procedure 1100 may start at step 1105, and continues to step 1110, where, as described in greater detail above, a prediction agent process/engine 248 collects travel information of a vehicle (e.g., current location, speed, direction, intended path, etc.) and in step 1115 determines a profile of the vehicle, where the profile is indicative of one or more real-time resource requirements of the vehicle (e.g., services, resources, applications, etc.). The profile may be a simple informative list of active resources, or may include specific requests for certain resources.

In step 1120, the prediction agent process may predict a path of the vehicle based on the travel information, such as by using a linear path prediction (based on a current path of the vehicle), a heuristic path prediction (based on statistical modelling according to the travel information and profile of the vehicle, e.g., electric cars follow chargers, morning traffic turns left, etc.), and/or a cooperative path prediction (based on the travel information corresponding to a pre-calculated path, e.g., where the infrastructure informs the vehicle what route to take based on traffic, available resources, etc., or else where the vehicle informs the infrastructure what path it intends to take. Note that as described above, step 1120 may in fact determine a plurality of predicted paths (where, e.g., the following steps may be performed for each corresponding predicted path, then relieving allocated resources along an unused path, assuming they aren't needed for a subsequent vehicle, of course).

In step 1125, the prediction agent process 248 may correspondingly determine a next resource node along the predicted path as described above, where the next resource node has one or more real-time resources corresponding to the one or more real-time resource requirements of the vehicle (e.g., services, resources, applications, etc., such as inductive coils, CPU processing capacity, traffic light control, etc.). As such, in step 1130, the prediction agent may predict a time of arrival of the vehicle being within range of the next resource node based on the travel information (e.g., and based on sensor data of time-affecting factors along the predicted path, such as traffic, average speed, traffic light conditions, and so on).

In step 1140, the prediction agent process can then inform the next resource node of the profile of the vehicle and the predicted time of arrival, where the informing causes the next resource node to "operate" the one or more real-time resources for the vehicle for the predicted time of arrival. As described above, such operation of resources may comprise allocating fog resources (CPU, memory, etc.), setting up application data (e.g., security settings, video streams, etc.), pre-charging inductive coils, changing traffic light conditions, etc.

The procedure 1100 may then illustratively end in step 1140, though notably with the option to repeat for each subsequent node along the path, and may revisit any step in any order, such as updating predictions, receiving further information, etc. It should be noted that while certain steps within procedure 1100 (and within environment 400 in FIG. 4 above) may be optional as described above, the steps shown in FIGS. 4 and 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 1100 and the steps of environment 400 in FIG. 4 are described separately, certain steps from each procedure may be incorporated into each other procedure, and the procedures are not meant to be mutually exclusive.

Furthermore, it should be noted that the vehicle may be an automobile, a public transit vehicle, a train, an unmanned aerial vehicle (UAV), a drone, an aircraft, an emergency vehicle, a bicycle, a Segway, and so on. For instance, while the techniques may benefit cars travelling at 50 KPH, they are especially useful in a high-speed train going at 300 KPH, the hand-offs to track side Wi-Fi may be every eight seconds or so (on a Hyperloop, on the order of one second), where the dead time around handoffs becomes a significant drain on total throughput. Also, in drone networks, a drone may want to voice a preference on the next ground node it reaches (because it has better location, or bandwidth latency, security, RF propagation or load properties), such that performing quick handoffs keeps long-distance drones constantly in touch.

The techniques described herein, therefore, provide for predictive resource preparation and handoff for vehicle-to-infrastructure (V2X) systems. In particular, the techniques herein provide for connected transportation solutions that build smart infrastructures across various transportation segments and deliver diverse applications for smart and connected communities, making the network infrastructure intelligent, adaptive, and capable of delivering application practicality and feasibility. In addition, the techniques herein make the V2X infrastructure adaptive to the application needs, and at the same time moves the burden of provisioning its own resources from applications to itself. This simplifies applications as the applications do not have to deal with variations in responses from the infrastructure's resource provisioning nuances, also removing application-to-application variation making experience independent of application implementation or versions.

Note further that as seen in some of the real-time use cases outlined above (and many more such cases to which the techniques herein may equally be applied), the feasibility of the use case will depend on the infrastructure's ability to deliver real-time predictive performance according to the techniques herein. And most importantly the techniques herein add value to the infrastructure by enabling the task of managing and provisioning resources under real-time constraints and not requiring that role in applications, instead providing it via the network.

More than simply tracking associativity movement between base stations, the techniques herein predict movement and apply the predictions to provision resources proactively in order to get the real-time system behavior in a complex V2X/Smart Communities IoT eco-system. A standard cell base station movement uses mostly the RSSI signal strength coupled with some probability algorithms to determine which base station is best suited for taking over and getting associated with the mobile device on the move. Cell base stations are characterized by relatively large area coverage (miles wide) meaning the movements are not that frequent. Furthermore, in an application like pre-cached content and web delivery for example, a single caching and web delivery engine could be serving multiple base stations, meaning as the mobile device moves between cell sites, the application probably never leaves the domain of the application resource (caching content server in this example).

On the other hand V2X communication technologies such as DSRC are characterized by much shorter coverage cells (e.g., meters) needing frequent changes in associativity. What is even more important in V2X domains—unlike the cellular communication—is that in several applications, the resources needed are physical in nature and located in close proximity with the communication RSC that is currently associated with the mobile vehicle. Also due to this nature as the vehicle moves its associativity from one RSC to next, the resource needs to move in its entirety to the next RSC where the vehicle's communication is now associated.

In addition, the speed, accuracy, and implications as needed by several smart applications such as those listed above are not comparable to that of content caching. In particular, the impact of caching content that is never actually used due to prediction error is not as detrimental to, as, for example, incorrect delivery of electrical charge to a wrong induction coil in anticipation of transferring that energy to the vehicle load (potentially leading to significant waste of energy).

While there have been shown and described illustrative embodiments that provide for predictive resource preparation and handoff for V2X systems, it is to be understood that various other adaptations and modifications may be made within the spirit and scope of the embodiments herein. For example, the embodiments have been shown and described herein with relation to certain types of environments, infrastructures, computer networks, protocols, etc. However, the embodiments in their broader sense are not as limited, and may, in fact, be used with other suitable types of environments, infrastructures, computer networks, protocols, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   collecting, by a prediction agent process in a network, travel information of a vehicle;
   determining, by the prediction agent process, a profile of the vehicle, the profile indicative of one or more real-time resource requirements of the vehicle;
   predicting, by the prediction agent process, a path of the vehicle based on the travel information;
   determining, by the prediction agent process, a next resource node along the predicted path having one or more real-time resources corresponding to the one or more real-time resource requirements of the vehicle, wherein the next resource node is a stationary node in the network, along the predicted path that participates with one or more vehicle-to-infrastructure (V2X) processes executing on the vehicle;

predicting, by the prediction agent process, a time of arrival of the vehicle being within range of the next resource node based on the travel information; and informing, by the prediction agent process, the next resource node of the profile of the vehicle and the predicted time of arrival, the informing causing the next resource node to operate the one or more real-time resources for the vehicle for the predicted time of arrival.

2. The method as in claim 1, wherein predicting the path comprises a linear path prediction based on a current path of the vehicle.

3. The method as in claim 1, wherein predicting the path comprises a heuristic path prediction based on statistical modelling according to the travel information and profile of the vehicle.

4. The method as in claim 1, wherein predicting the path comprises a cooperative path prediction based on the travel information corresponding to a pre-calculated path.

5. The method as in claim 4, wherein the prediction agent process operates within one or more devices of a network infrastructure other than the vehicle, and wherein the cooperative path prediction is based on a negotiation between the vehicle and the prediction agent process.

6. The method as in claim 1, wherein predicting the path comprises:
determining a plurality of predicted paths, wherein the prediction agent process determines a corresponding next resource node along each of the plurality of predicted paths, predicts a corresponding time of arrival of the vehicle at each of the corresponding next resource nodes, and informs each of the corresponding the next resource nodes of the profile of the vehicle and the corresponding predicted time of arrival.

7. The method as in claim 1, wherein predicting the time of arrival is based on the travel information and sensor data of time-affecting factors along the predicted path.

8. The method as in claim 1, wherein the next resource node is caused to operate a traffic signal as the one or more real-time resources for the vehicle for the predicted time of arrival.

9. The method as in claim 8, wherein the next resource node is caused to operate the traffic signal according to a vehicular priority of the vehicle against one or more other vehicles predicted to be at the traffic signal at the predicted time of arrival.

10. The method as in claim 1, wherein the next resource node is caused to operate a dynamic wireless power transfer as the one or more real-time resources for the vehicle for the predicted time of arrival.

11. The method as in claim 10, wherein the next resource node is caused to operate the dynamic wireless power transfer by pre-charging an in-road inductive charging system substantially near the predicted time of arrival for delivery of an inductive charge to the vehicle at an actual time of arrival.

12. The method as in claim 1, wherein the prediction agent process operates within one or more devices of a network infrastructure other than the vehicle.

13. The method as in claim 1, wherein the prediction agent process operates within a current resource node, and wherein informing comprises a state handoff between the current resource node and the next resource node.

14. The method as in claim 13, wherein the state handoff comprises point-to-point (P2P) communication between the current resource node and the next resource node.

15. The method as in claim 1, further comprising:
informing the vehicle of a pre-calculated path toward one or more particular resource nodes having one or more real-time resources corresponding to the one or more real-time resource requirements of the vehicle.

16. An apparatus, comprising:
one or more network interfaces to communicate within a vehicle-to-infrastructure (V2X) network;
a processor coupled to the network interfaces and adapted to execute one or more processes; and
a memory configured to store a process executable by the processor, the process when executed operable to:
collect travel information of a vehicle;
determine a profile of the vehicle, the profile indicative of one or more real-time resource requirements of the vehicle;
predict a path of the vehicle based on the travel information;
determine a next resource node along the predicted path having one or more real-time resources corresponding to the one or more real-time resource requirements of the vehicle, wherein the next resource node is a stationary node in the V2X network, along the predicted path that participates with one or more V2X processes executing on the vehicle;
predict a time of arrival of the vehicle being within range of the next resource node based on the travel information; and
inform the next resource node of the profile of the vehicle and the predicted time of arrival to cause the next resource node to operate the one or more real-time resources for the vehicle for the predicted time of arrival.

17. The apparatus as in claim 16, wherein the process when executed to predict the path is further operable to use a prediction selected from a group consisting of: a linear path prediction based on a current path of the vehicle; a heuristic path prediction based on statistical modelling according to the travel information and profile of the vehicle; and a cooperative path prediction based on the travel information corresponding to a pre-calculated path.

18. The apparatus as in claim 16, wherein the next resource node is caused to operate a traffic signal as the one or more real-time resources for the vehicle for the predicted time of arrival.

19. The apparatus as in claim 16, wherein the next resource node is caused to operate a dynamic wireless power transfer as the one or more real-time resources for the vehicle for the predicted time of arrival.

20. A tangible, non-transitory, computer-readable media having software encoded thereon, the software when executed by a processor operable to:
collect travel information of a vehicle;
determine a profile of the vehicle, the profile indicative of one or more real-time resource requirements of the vehicle;
predict a path of the vehicle based on the travel information;
determine a next resource node along the predicted path having one or more real-time resources corresponding to the one or more real-time resource requirements of the vehicle, wherein the next resource node is a stationary node in a vehicle-to-infrastructure (V2X) network, along the predicted path that participates with one or more V2X processes executing on the vehicle;

predict a time of arrival of the vehicle being within range of the next resource node based on the travel information; and inform the next resource node of the profile of the vehicle and the predicted time of arrival to cause the next resource node to operate the one or more real-time resources for the vehicle for the predicted time of arrival.

* * * * *